United States Patent [19]

Peroutky

[11] 4,350,379
[45] Sep. 21, 1982

[54] UNIVERSAL LIFTING MAGNET

[75] Inventor: Donald C. Peroutky, Schenectady, N.Y.

[73] Assignee: General Electric Company, Schenectady, N.Y.

[21] Appl. No.: 195,865

[22] Filed: Oct. 10, 1980

[51] Int. Cl.³ .............................................. B66C 1/04
[52] U.S. Cl. .................................................. 294/65.5
[58] Field of Search ...................... 294/65.5, 65, 67 R, 294/81 R, 86 R; 335/291, 289, 290, 255

[56] References Cited

U.S. PATENT DOCUMENTS

| | | |
|---|---|---|
| 1,325,914 | 12/1919 | Rowell . |
| 3,019,845 | 2/1962 | Mayall ................................ 294/65.5 |
| 3,139,563 | 6/1964 | Freeman ............................. 317/164 |
| 3,298,730 | 1/1967 | Soley .................................. 294/65.5 |
| 3,355,209 | 11/1967 | Richards, Jr. et al. ............. 294/65.5 |
| 3,596,967 | 8/1971 | Carter ................................ 294/65.5 |
| 3,856,157 | 12/1974 | Hill ..................................... 214/1 |
| 3,968,986 | 7/1976 | Nagata ............................... 294/65.5 |

FOREIGN PATENT DOCUMENTS 96576  7/1963  Denmark .
516606  6/1977  U.S.S.R. ............................. 294/65.5

OTHER PUBLICATIONS

Computer Vision and Sensor-Based Robots, ed. by G. D. Dodd and L. Rossol, Plenum Press, New York, 1979, pp. 117, 119, 124, 125, 128, 129.

Primary Examiner—James B. Marbert
Attorney, Agent, or Firm—Donald R. Campbell; James C. Davis, Jr.; Marvin Synder

[57] ABSTRACT

An electromagnet on the gripper of an automatic assembly machine has a specially shaped pole piece structure with curved surfaces and flat surfaces, part of which are undercut in depth, to handle several different objects. Motor end bells and rotors in various orientations are picked up and transported during automatic assembly of small motors. There is quick release of light weight parts such as end bells.

6 Claims, 9 Drawing Figures

UNIVERSAL LIFTING MAGNET

BACKGROUND OF THE INVENTION

This invention relates to electromagnets for handling a number of different objects in automatic assembly operations.

The automatic assembly of small motors and other products by a robotic machine involves grasping, transporting, and placing parts for assembly. Mechanical tools functioning like human hands are required for these tasks. To conserve time and reduce costs, it is desirable to use a single tool to perform as many part handling tasks as possible. Such a multiple purpose tool also saves energy by decreasing total assembly machine operating time per unit assembled, and conserves floor space by eliminating storage space that would be required for additional tools that are eliminated.

SUMMARY OF THE INVENTION

The universal electromagnet capable of performing multiple parts handling jobs is comprised of a magnetic material base, coil structures around magnetic material cores, and a pair of shaped magnetic pole pieces. The mirror image magnet pole pieces have both an outer flat surface for lifting objects with substantially plane areas of magnetic material, and an inner curved surface for lifting cylindrical objects. Light weight parts such as motor end bells and heavy parts such as rotors are lifted with constant excitation current. To limit residual magnetic flux, which tends to hold light weight parts when coil excitation is removed, a portion of the flat surfaces of the pole pieces are undercut in depth and filled with a nonmagnetic material. Light weight parts are attracted to the magnet through an air gap equivalent to the undercut depth. The remaining flat pole piece surface which is not undercut is used to pick up heavy parts with plane surfaces with no gap in the magnetic circuit.

The preferred embodiment is a universal magnet secured to the gripper of an automatic assembly machine. The overall configuration, with a limited dimension outside diameter and large center hole, is tailored for handling fractional horsepower motor parts. The magnet lifts end bells with either side up, and long stack and short stack rotors both horizontally and vertically. Alternative configurations are suitable for other assembly tasks.

DESCRIPTION OF THE PREFERRED EMBODIMENT

Figure 1:
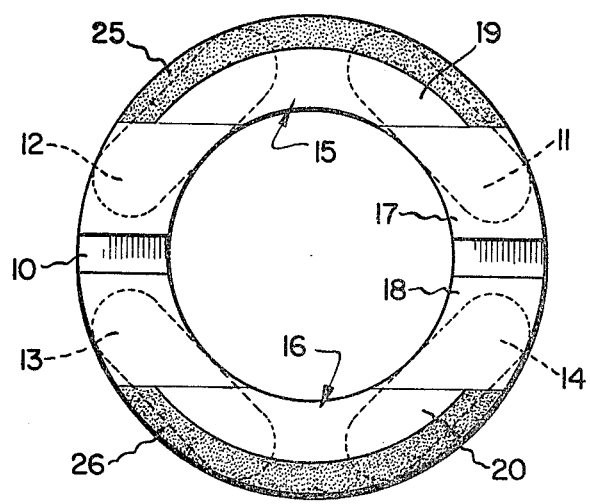
FIGS. 1 and 2 are plan and side views, the latter partly in section, of a universal magnet for handling motor components.
Figure 2:
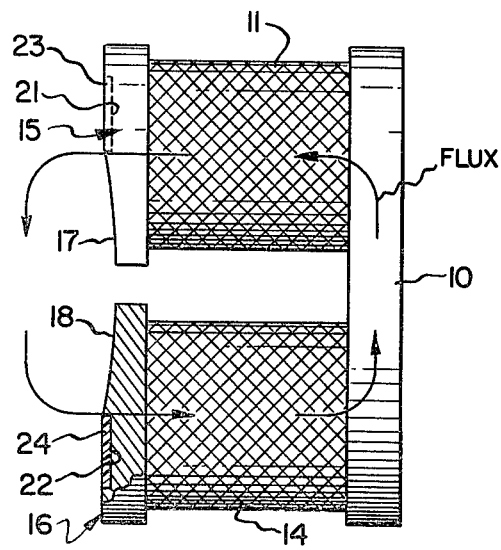

The general configuration of the universal magnet and pole pieces is shown in FIGS. 1 and 2. This electromagnet is designed to pick up and transport fractional horsepower motor parts, specifically end bells and various sizes of rotors. It is fastened to a gripper and is used for handling these parts in automatic assembly operations. The magnet has a limited dimension outside diameter so that it can lift rotors vertically as in FIG. 9, and has a large center hole to clear obstructions on the rotor shaft.

The main components of the device are a magnetic base ring 10, four magnetic core and coil structures 11-14, two per pole, and a pair of semi-annular, mirror image, shaped magnetic pole pieces 15 and 16. The fabrication and assembly of these components is conventional. The magnetic flux path is indicated by the arrows in FIG. 2; one of the pole pieces is a north pole and the other is a south pole, or vice versa.

Magnetic pole pieces 15 and 16 have curved surfaces 17 and 18 for lifting cylindrical objects, and also have flat surfaces 19 and 20 for lifting objects with plane areas or substantially plane areas of magnetic material. The magnet is designed to lift light weight objects like motor end bells and heavy objects like motor rotors with constant excitation current. To limit residual magnetic flux, which tends to hold light weight parts when coil excitation is removed, a portion of the flat surfaces of the pole pieces are undercut in depth at 21 and 22 and the undercut volume is replaced with a nonmagnetic material such as epoxy 23 and 24. Light weight parts, like end bells, are attracted to the magnet through an air gap equivalent to the undercut depth. This undercut area is bounded by the inner edge of the pole piece and by an arc whose diameter is less than the maximum diameter. The remaining flat pole piece surface which is not undercut, peripheral strips 25 and 26 shown stippled in FIG. 1, is used to pick up heavy parts with no gap in the magnetic circuit.

Figure 3:
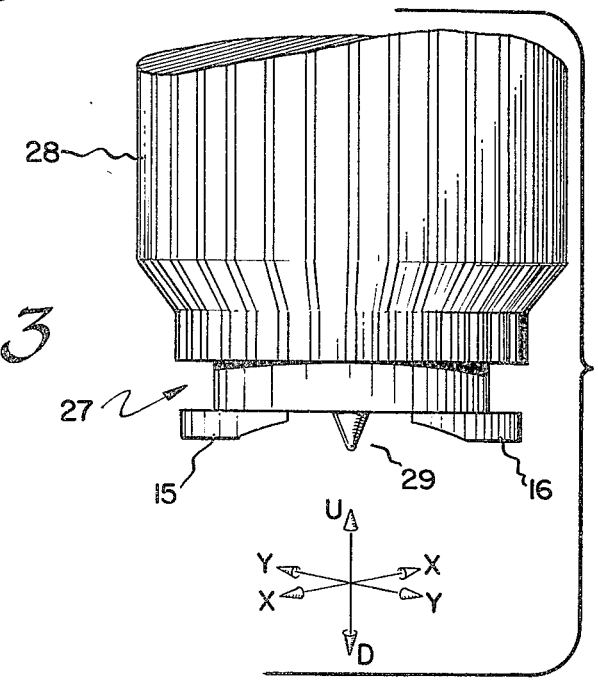
FIG. 3 is a fragmentary side view of the gripper of a robotic machine to which the universal magnet is fastened.

Referring to FIG. 3, the universal electromagnet 27 is bolted to the end of the gripper 28 or "hand" of a programmed assembly machine, which is typically a pneumatically operated, split-finger expandable chuck gripper that is movable, upon command, up and down and in the x and y directions. Otherwise the gripper is conventional except that it is modified to have a recessed centering pin 29 which is lowered at the proper time to center a motor end bell. Further information on the robotic machine and the steps for assembling a small motor are given in the inventor's copending application Ser. No. 169,024 filed July 15, 1980, "Dispenser for Screw Fastener Nuts", assigned to the instant assignee.

The general relation between magnetic flux, contact area, and force for an electromagnet is $B^2A = 72 (10^6)F$, where $B$=flux density-lines/in$^2$, $A$=area-in$^2$, and $F$=force-lbs. The magnet, used for fractional horsepower assembly operations, is sized to provide near saturation flux density in the magnet base at nominal coil excitation and with the pole pieces shorted with large cross section area magnetic material. In all cases, the flux density required for lifting the different motor components is less than the saturation flux density of the magnet material. Thus, reliable lifting is assured. Lifting against a 1 g acceleration is assumed in the calculations.

Figures 4, 5:
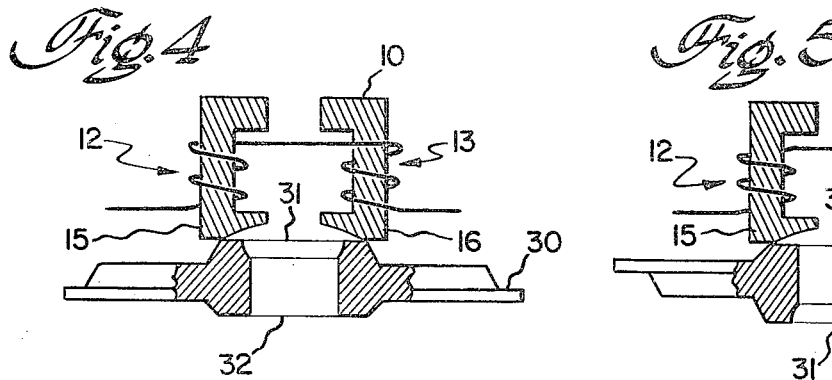
FIGS. 4 and 5 are diagrams showing the lifting of motor end bells from both sides.

FIGS. 4 and 5 illustrate diagrammatically the lifting of a motor end bell 30 with one side up and then the other side up. This particular end belt or end shield is relatively light weight (0.6 lbs) and has magnetic caps 31 and 32 over the bearing bosses, the remainder of the part being nonmagnetic. The end caps have ring-like plane surfaces whose maximum diameter is less than that of the peripheral flat areas 25 and 26 of the pole pieces which are not undercut. Thus, end bell 30 is picked up through an air gap of approximately 0.008 inches in the example given, and is quickly released when the coil excitation is removed. The loose magnetic coupling makes it possible to shift the part after being picked up by lowering centering pin 29 which engages the rotor shaft bearing surface and is then retracted.

Figure 6:
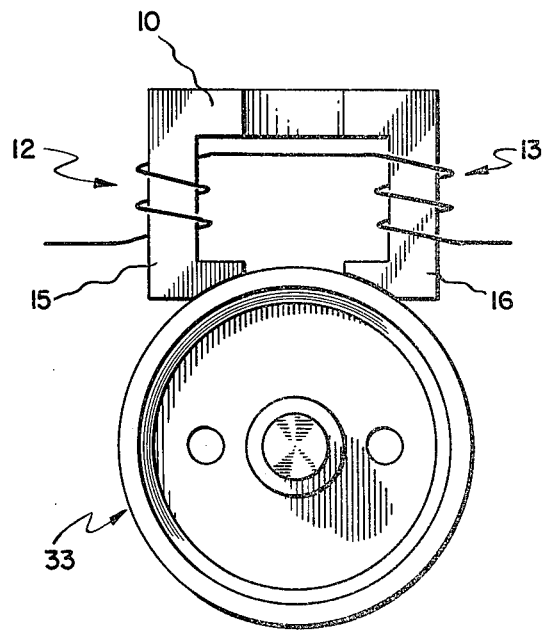
FIGS. 6-8 are end and side views of lifting long and short rotors horizontally.
Figure 7:
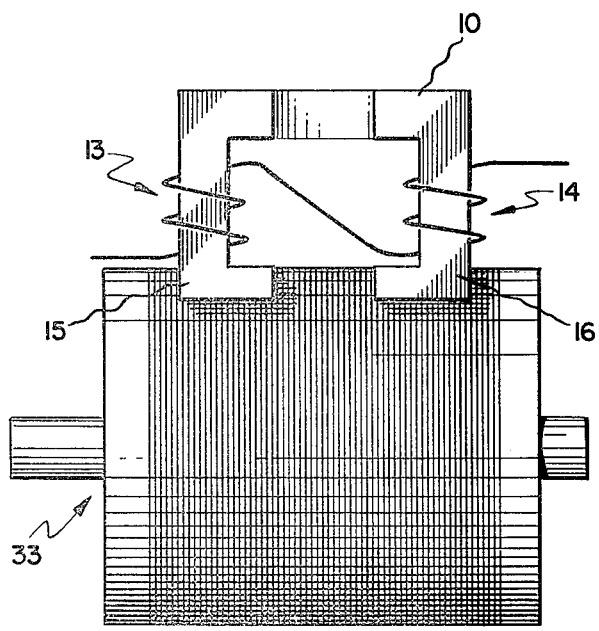
Figure 8:
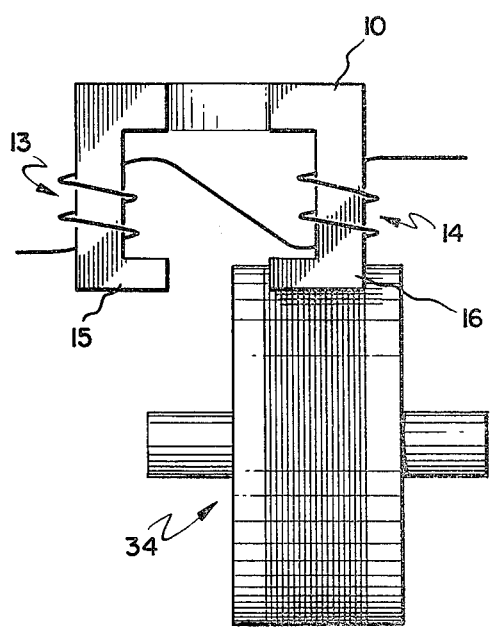

FIGS. 6–8 show the magnet lifting rotors horizontally by contacting the rotor cylindrical lamination stack. Relatively heavy long stack rotors 33 (5.2 lb, for instance) are lifted utilizing the full area of both curved pole piece surfaces 17 and 18. Short stack rotors 34 are lifted with half the available curved pole piece area because the large hole in the center of the magnet overspans the lamination stack.

Figure 9:
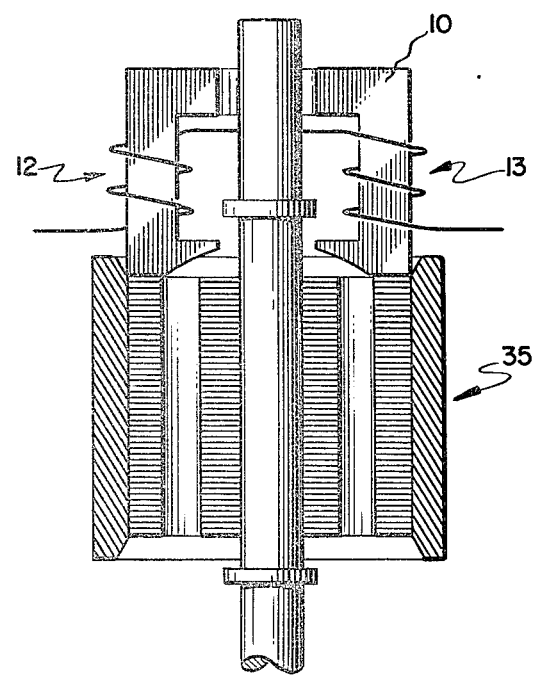
FIG. 9 illustrates picking up a motor rotor vertically.

As the motor is being assembled, the rotor is moved by the gripper from a supply tray where it is horizontally oriented to an erecting fixture. The gripper then picks up the rotor vertically and, at the assembly station, drops the rotor into an end bell and stator. Turning to FIG. 9, the rotor shaft passes through the large center hole in the electromagnet and the end of the lamination stack of rotor 35 is contacted with the peripheral flat magnet areas 25 and 26 which are used to pick up the heavy part with no gap in the magnetic circuit.

Similar universal magnet and pole piece configurations can be provided for other automatic assembly tasks. This multiple purpose tool conserves assembly time and reduces costs. Further, floor space is conserved by eliminating storage space that would be required for additional tools that this invention eliminates.

While the invention has been particularly shown and described with reference to a preferred embodiment thereof, it will be understood by those skilled in the art that the various changes in form and details may be made therein without departing from the spirit and scope of the invention.

The invention claimed is:

1. A universal electromagnet capable of lifting different magnetic parts comprising:
   a magnetic base ring;
   a pair of approximately semi-annular, shaped magnetic pole pieces; and
   magnetic core and coil structures between said base ring and each pole piece;
   said pole pieces being shaped in mirror image fashion to have inner curved surfaces for lifting cylindrical parts and outer flat surfaces for lifting parts with substantially plane surfaces, said flat surfaces further having undercut areas that are filled with nonmagnetic material and provide small air gaps, whereby heavy and light weight parts with plane surfaces can be lifted and quickly released.

2. The universal electromagnet of claim 1 wherein said flat surface undercut areas are bounded by the inner edges of said pole pieces and by arcs whose diameter is less than the maximum diameter of said pole pieces.

3. The combination of an automatic assembly machine gripper and a universal electromagnet capable of lifting different magnetic parts which comprises: 'a magnetic base;
   a pair of mirror image, shaped magnetic pole pieces; and
   magnetic core and coil structures between said base and each pole piece;
   said pole pieces having inner curved surfaces for lifting cylindrical parts and outer flat surfaces for lifting parts with substantially plane surfaces, said flat surfaces having undercut areas that are filled with nonmagnetic material and provide small air gaps, whereby heavy and light weight parts with plane surfaces can be lifted and quickly released.

4. The combination of claim 3 wherein said magnetic base and pair of shaped pole pieces both have a center hole to clear obstructions on the parts to be lifted.

5. The combination of an automatic assembly machine gripper and a universal electromagnet capable of lifting motor rotors and end bells in various orientations which comprises:
   a magnetic base ring;
   a pair of approximately semi-annular, shaped magnetic pole pieces; and
   magnetic core and coil structures between said base ring and each pole piece;
   said pole pieces being shaped in mirror image fashion to have inner curved surfaces for the horizontal lifting of long and short cylindrical rotors, and outer flat surfaces that have undercut areas filled with nonmagnetic material to provide small air gaps so that relatively heavy rotors which contact areas of said flat surfaces that are not undercut can be picked up when vertically oriented and so that relatively light weight end bells which are attracted to the electromagnet through said air gaps can be picked up and quickly released.

6. The combination of claim 5 wherein said flat surface undercut areas are bounded by the inner edges of said pole pieces and by arcs whose diameter is less than the maximum diameter of said pole pieces.

* * * * *